United States Patent [19]

Dellinger et al.

[11] Patent Number: 4,955,958
[45] Date of Patent: Sep. 11, 1990

[54] AIRCRAFT

[75] Inventors: Jürgen Dellinger, Achim; Ulrich Krämer, Syke-Barrien, both of Fed. Rep. of Germany

[73] Assignee: MBB GmbH, Bremen, Fed. Rep. of Germany

[21] Appl. No.: 249,441

[22] Filed: Sep. 26, 1988

[30] Foreign Application Priority Data

Sep. 26, 1987 [DE] Fed. Rep. of Germany ....... 3732481

[51] Int. Cl.$^5$ .......................... B64C 3/58; B64C 9/32
[52] U.S. Cl. ..................................... 244/213; 244/113
[58] Field of Search .................. 244/213, 113, 225, 36

[56] References Cited

U.S. PATENT DOCUMENTS 2,205,714 6/1940 Doepp ................................ 244/113

FOREIGN PATENT DOCUMENTS 40227   3/1937  Netherlands ........................ 244/113
272455 12/1927  United Kingdom ................ 244/213
605604  7/1948  United Kingdom ................ 244/113

Primary Examiner—Joseph F. Peters, Jr.
Assistant Examiner—James M. Kannofsky
Attorney, Agent, or Firm—Ralf H. Siegemund

[57] ABSTRACT

An aircraft with no separate elevators in the tail end of the fuselage and having wings arranged approximately in the middle portion of the fuselage, is improved by a single flap on the underside of the wings for extending down to a variable degree and being arranged at a point between 49 and 54% of the local chord depth as measured from the leading edge.

5 Claims, 1 Drawing Sheet

AIRCRAFT

BACKGROUND OF THE INVENTION

The present invention relates to an aircraft being basically comprised of a fuselage, side rudder on the tail end of the fuselage and aerodynamic lift producing wings there being no elevators provided at the tail end of the fuselage nor in the central portion of the wing.

Aircraft without elevational control at the tail end of the fuselage are usually regarded as tailless aircraft or all wing or wing only aircraft. Aircraft of this kind can be used as gliders but also some small motor or engine driven aircraft have this kind of construction. Owing to the missing, separate elevational control at the tail end of the craft, it is of course necessary to provide some means on the wings which establish the requisite stability as well as elevational control.

It is of course well known in the aircraft industry to have control flaps in some form on the wings usually these are landing flaps or ailerons or the like which provide e.g. in conjunction with slats, additional lift or drag as the need arises with concurring changes in momentum. These changes of course have some influence on the stability and cause shifting of the neutral point in the craft.

In addition to the ailerons and landing flaps it is also known to provide so called spoilers on the upper and/or under-side of the wing. Such spoilers are provided for braking i.e. they increase the resistance of the craft and reduce concurrently the lift as it concurs with momentum changes. Therefore in these cases it is necessary to provide further steps for maintaining the balance of the momentum by means of elevational rudder.

For gliding control on the other hand these kinds of brake flaps and spoilers are not suitable for employment in all-wing aircraft. Such aircraft is known to provide ailerons and elevators on the wings as shown e.g. in German printed patent application 28 03 041. Here a craft is shown which provides for these features. On the other hand the ailerons and rudders are not suitable for control of the gliding angle.

DESCRIPTION OF THE INVENTION

It is an object of the present invention to provide a new and improved tailless aircraft such that a spoiler can be provided for purposes of glide angle control without reducing the lift.

In accordance with the preferred embodiment of the present invention it is suggested to provide on the underside of each wing a flap for flow dependent production of resistance such that for maintaining the balance of momentum the neutral point should not change within the range from 49 to 54% of the local chord depth. The inventive flap as provided on the underside in the area of the neutral point produces a resistance that is in fact without effect on the lift nor on the balance of momentum nor does it affect the control and stability of the craft and thus is effective as pure glide angle assistant. The flaps may but do not have to extend over the entire width of the wing. Moreover, it is possible to either provide the flaps to be just shifted down vertically from the underside of the wing or they may be more conventionally pivoted on the underside to pivot or fold down from a horizontal position to a downward extending vertical position.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding to the detailed description of the drawings FIGS. 1 and 2 show a tailless aircraft 10 having a fuselage 15 whose tail end is not provided with separate elevators. This craft has two wings 11 and 12 which, as compared with crafts having tail end elevators, are more receded to the tail end. Otherwise the wings have a contour and configuration as is generally known from aircraft.

Figure 1:
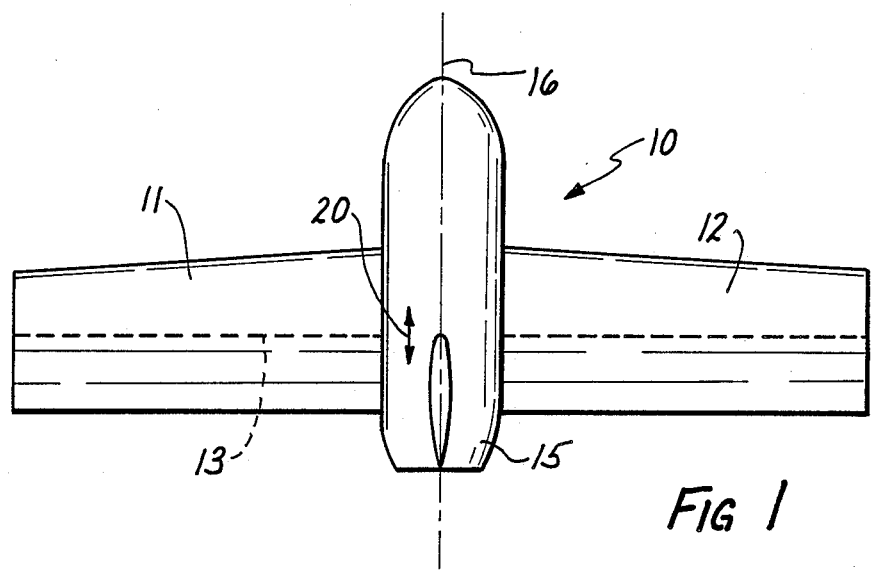
FIG. 1 is an elevation of the craft in accordance with the preferred embodiment of the present embodiment of the present invention.
Figure 2:
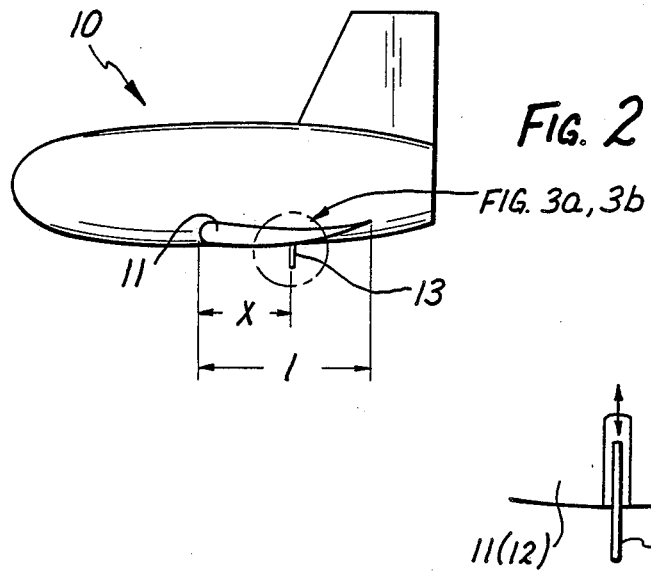
FIG. 2 is a side view of the craft shown in FIG. 1.
Figure 3A:
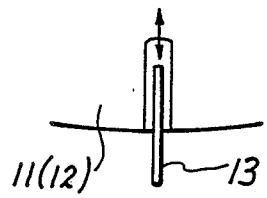
FIG. 3a and FIG. 3b being fragmentary views of FIG. 2 show certain details.
Figure 3B:
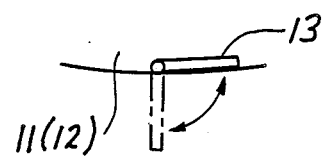

Both wings 11 and 12 include respectively a control flap 13 which is shown in FIG. 2 to project from the underside straight down. As stated these flaps 13 may be provided for sliding vertically down from and up into the respective wing 11 or 12 (see FIG. 3a); alternatively flaps 13 may be pivotably linked to the underside of the respective wing to be pivoted and folded from a horizontal and retracted position to a 90 degrees down protracted disposition as shown in FIG. 3b.

The position x in relation to the wing and chord depth is particularly selected so that on adjustment of the resistance a change in resistance is produced without reducing the lift. The flaps are thus an aid for controlling the glide angle as is important for tailless craft of the type shown here. Moreover, these flaps are not supposed to interfere with the momentum equilibrium or balance nor with the controlibility and maneuverability as well as stability of the craft. Therefore it is possible to provide the flaps over the entire span of the respective wing as shown but this is not a requirement. They may well be shorter and cover only partially the length of each wing. Tests have shown that the flaps in accordance with the preferred embodiment of the present invention do in fact assist in the control of the glide angle of tailless aircraft.

As far as particulars are concerned the disposition of the flap 13 is within the range of 49–54% of the local chord depth. If geometrically projected into the fuselage, (range 20) the range covers the point on the longitudinal axis 16 of the fuselage where the neutral point N is situated. That is a geometric point which is situated in a location such that any resistance deemed acting on that point is not interfering with nor produces any lift. In other words, the location of the flap 13 when projected geometrically onto the longitudinal axis 16 of the craft is to be as close as possible to that neutral point N. If the flap 13 is located within the stated range of chord depth this condition is indeed fulfilled. This feature is in fact a controlling one to maintain the equilibrium balance of the momentum as well as the controllibility and stability, simply because the flap 13 is just effective as glide angle control assist and in no other way.

The invention is not limited to the embodiments described above but all changes and modifications thereof, not constituting departures from the spirit and scope of the invention, are intended to be included.

We claim:

1. Aircraft with no separate elevators in the tail end of the fuselage and having wings, the improvement comprising a single flap means on the respective underside of the wings for extending down to a variable degree and being arranged at a point between 49 and 54% of the local chord depth as measured from the leading edge.

2. The improvement as in claim 1, said flap means extend over substantially the entire span of the wing.

3. The improvement as in claim 1, said flap means being limited to partial ranges and portions of the span.

4. The improvement as in claim 1, said flap means being provided for downward movement in a vertical direction.

5. The improvement as in claim 1, said flap means being pivotably linked to the underside of the wings.

* * * * *